United States Patent [19]
Chaney et al.

[11] Patent Number: 5,944,872
[45] Date of Patent: *Aug. 31, 1999

[54] METHOD FOR PHYTOMINING OF NICKEL, COBALT AND OTHER METALS FROM SOIL

[75] Inventors: Rufus L. Chaney, Beltsville; Jay Scott Angle, Ellicot City, both of Md.; Alan J.M. Baker, Sheffield, United Kingdom; Yin-Ming Li, Potomac, Md.

[73] Assignees: University of Maryland at College Park, College Park, Md.; The United States of America as represented by the Secretary of Agriculture, Washington, D.C.; The University of Sheffield, Sheffield, United Kingdom

[*] Notice: This patent is subject to a terminal disclaimer.

[21] Appl. No.: 08/879,813

[22] Filed: Jun. 20, 1997

Related U.S. Application Data

[63] Continuation of application No. 08/470,440, Jun. 6, 1995, Pat. No. 5,711,784.

[51] Int. Cl.$^6$ ...................................................... C22B 3/18
[52] U.S. Cl. ................................. 75/712; 47/58; 210/602
[58] Field of Search .................................. 75/712; 47/58; 210/602

[56] References Cited

U.S. PATENT DOCUMENTS

| | | | |
|---|---|---|---|
| 5,320,663 | 6/1994 | Cunningham | ............................. 75/432 |
| 5,393,426 | 2/1995 | Raskin et al. | . |
| 5,711,784 | 1/1998 | Chaney et al. | ............................. 75/712 |

OTHER PUBLICATIONS

Salt et al, "Phytoremediation: A Novel Strategy for the Removal of Toxic Metals from the Environment Using Plants", Biotechnology, vol. 13, pp. 468–473, May 1995.
Morrison et al, "Nickel Uptake by Alyssum Species", Plant Science Letters, vol. 17, pp. 451–457, 1980.
Homer et al, "Characterization of the Nickel–rich Extract from the Nickel Hyperaccumulator Dichapetalum Geloniodes", Phytochemistry, vol. 30, No. 7, pp. 2141–2145, 1991 No Month.
Homer et al, "Comparative Studies of Nickel, Cobalt, and Copper Uptake by Some Nickel Hyperacculators of the Genus Alyssum", Plant and Soil, vol. 138, pp. 195–205, 1991 No Month.
Brooks et al, "Some Observation on the Ecology, Metal Uptake and Nickel Tolerance of Alyssum Serpyllifolium Subspecies from the Iberian Peninsula", Vegetatio, vol. 45, pp. 183–188, 1981 No Month.
Brooks et al, "The Criminal Foem and Physiological Function of Nickel in Some Iberian Alyssum Species", Physiologia Plantarium, vol. 51, No. 2, pp. 167–170, 1981 No Month.
Brooks et al, "Nickel Accumulation by European Species of the Genus Alyssum", Proc. R. Soc. Lond. B. 200, pp. 217–224, 1978 No Month.
Brooks et al, "Detection of Nickeliferous Rocks by Analysis of Herbarium Specimens of Indicator Plants", Journal of Geochemical Exploration, vol. 7, pp. 49–57, 1977 No Month.
Brooks et al, "Hyperaccumulation of Nickel by *Alyssum Linnaeus* (Cruciferae)", Proc. R. Soc. Lond. B. 203, pp. 387–403, 1979.
Brooks, "Accumulation of Nickel by Terrestrial Plants", edited by J.O. Nriagu, Nickel in the Environment, Wiley, New York, pp. 407–430, 1980 No Month.
Baker et al, "The Possibility of an in Situ Heavy Metal Decontamination of Polluted Soils Using Crops of Metal–accumulating Plants", Resources, Conservation and Recycling, vol. 11, pp. 41–49, 1994 No Month.
Reeves, "The Hyperaccumulation of Nickel by Serpentine Plants", The Vegetation of Ultramafic (Serpentine) Soils: Proceedings of The First International Conference on Serpentine Ecology, pp. 253–277, 1991.
Reeves et al, "Uptake of Nickel by Species of Alyssum, Bornmuellera, and Other Genera of Old World Tribus Alysseae", Taxon, vol. 32, No. 2, pp. 187–192, May 1983 No Month.
Robinson et al, "The Nickel Hyperaccumulator Plant *Alyssum Bertolonii* as a Potential Agent for Phytoremediation and Phytomining of Nickel", Journal of Geochemical Exploration, vol. 59, pp. 75–86, 1997 No Month.
de Varennes et al, "Effect of Heavy Metals on the Growth and Mineral Composition of a Nickel Hyperaccumulator", Journal of Plant Nutrition, Vol. 19, No. 5, pp. 669–676, 1996 No Month.
Baker, "Terrestrial Higher Plants Which Hyperaccumulate Metallic Elements—A Review of Their Distribution, Ecology and Phytochemistry", Biorecovery, vol. 1, pp. 81–126, 1986 No Month.
Gambi et al, "Investigation on a Nickel Accumulating Plant: "*Alyssum bertolonii*" Desv. I. Nickel, Calcium and Magnesium Content and Distribution During Growth", Webbia Abstract, 32:175–188 May 1998.
Gambi et al, "Some Aspects of the Metabolism of *Alyssum bertolonii* Desv. pp. 319–329" Abstract, 1992 No Month.

*Primary Examiner*—Melvin Andrews
*Attorney, Agent, or Firm*—Oblon, Spivak, McClelland, Maier & Neustadt, P.C.

[57] ABSTRACT

Nickel/cobalt, as well as platinum and palladium metal family members are recovered from soil by growing Brassicaceae plants, specifically Alyssum in soil containing nickel/cobalt as well as other metals. The soil is conditioned by maintaining a low pH, low calcium concentration, and the addition of ammonium fertilizer and chelating agents thereto. Nickel accumulation on the order of 2.5 percent or better in above-ground tissues is achieved, which permits recovery of the metal by harvesting the above-ground plant materials, drying, and then combusting the same, to oxidize or vaporize organic materials and recover the metals sequestered therein at 10–20 fold higher concentrations than in the soil, in a form which can be used in conventional Ni refinery or smelting operations.

12 Claims, No Drawings

METHOD FOR PHYTOMINING OF NICKEL, COBALT AND OTHER METALS FROM SOIL

This is a continuation application of application Ser. No. 08/470,440 filed Jun. 6, 1995 now U.S. Pat. No. 5,711,784.

BACKGROUND OF THE INVENTION

1. Field of the Invention

This invention pertains to a method of extracting nickel, cobalt and other metals, including the platinum and palladium metal families, from soil by cultivation of the soil with hyperaccumulating plants that concentrate these metals in above-ground portions of the plants, which can be harvested, dried and smelted to recover the metal (metal phytomining).

2. Background of the Prior Art

It has long been known that certain types of soil and geological materials, including serpentine, lateritic serpentine, ultramafic and meteor-impacted soils may be rich in nickel or cobalt, and are sites for mining of these metals. The cost of conventional mining for these metals remains high, and the level of metals required in geological materials to which current technology may be usefully applied are much higher than most serpentine, lateritic serpentine, ultramafic and meteor-derived soils.

U.S. Pat. No. 5,364,451, Raskin et al, is directed to a method of removing metals from metal-rich soil by growing genetically altered plants of the family Brassicaceae in these soils, so as to remediate polluted soils at a reduced cost. Suitable parents for the mutants that are the subject of the Raskin patent include *B. juncea*. While the patent generally describes a large number of metals that may be recovered, specific artificial examples are directed to recovery of chromium and lead. The entire disclosure of U.S. Pat. No. 5,364,451 is incorporated herein by reference.

A review of the examples of this reference, and application of the technology proposed, illustrates continuing problems posed in remediation of metal-rich soil, and recovery of the metals therefrom. In particular, the examples set forth reflect artificial culture in sand media with intermittent feeding with phosphate to permit plants to grow without severe yield reduction and without severe lead toxicity. The patent also relies on genetic mutations that are produced by random "mutagenesis", that is, the creation of a library of mutants or potential mutants from a starting parent by indiscriminate application of a mutagen, coupled with screening the offspring to define acceptable hyperaccumulators. While promising, the Raskin patent offers little basis for an opportunity to proceed directly with soil remediation through plant growth or culturing. Additionally, the patent offers little realistic opportunity for recovery of the metal itself, indicating only that under circumstances (not identified) the metal can actually be reclaimed.

One of the most widely found, and technologically important metals is nickel. Nickel is a natural constituent in all soils, being particularly high in concentration in serpentine, lateritic serpentine, ultramafic and meteor-derived soils. Cobalt, which has chemical and geological characteristics very similar to nickel, can similarly be found in these soils, and is another valuable metal. Other metals that are also subjects for phytomining within the scope of the invention, include those of the platinum and palladium families, including palladium, rhodium, ruthenium, platinum, iridium, osmium and rhenium which commonly co-occur with Ni and Co. Cultivation of plants which are hyperaccumulators of these metals, in metal-rich soils, or "phytomining", is a desirable alternative as a means for recovering metals from soil. Ordinary cultivation methods, however, without adequate preparation and maintenance of soil conditions, does not lead to adequate hyperaccumulation of metals in the plants, sufficient to make recovery of the metals from the plants economically interesting. Additionally, specific methods for recovery of the metals remain to be explored. Accordingly, it remains an object of those of skill in the art to develop a reliable system for phytomining of soils rich in nickel, cobalt and the other identified metals, naturally occurring or otherwise, that will lead to a recovery of these metals at economically acceptable levels.

SUMMARY OF THE INVENTION

By screening a wide variety of plants from the Brassicaceae family, the inventors have identified plants in the Alyssum genus which may be hyperaccumulators of nickel and which accumulate valuable amounts of cobalt. By definition, hyperaccumulator plants accumulate over 1000 mg Ni or Co/kg dry weight growing in the soils where they evolved. Because cobalt occurs at about 3–10% of the level of Ni in the listed soils, Ni is the dominant toxic metal which induced evolutionary selection of the Ni hyperaccumulator plants and Co is accumulated to economically useful levels but Ni hyperaccumulation is the dominant economic benefit of the phytomining technology. Evidence suggests members of the section Odontarrhena of the genus Alyssum are likely candidates as nickel hyperaccumulators. The plant may also concentrate, in the above-ground plant tissues, metal from the platinum and palladium families, including Pd, Rh, Ru, Pt, Ir, Os and Re, in significant amounts. Accumulation of nickel in plant tissues in excess of 2.5 percent is practicable.

The metals listed accumulated in biomass by growing nickel hyperaccumulating Alyssum species in the target soils. Some 48 taxa within the section Odontarrhena of the genus Alyssum are known to be hyperaccumulators of nickel. These include the following species already evaluated: *A. murale*, and *A. pintodasilvae* (*A. serpyllifolium* ssp.), *A. malacitanum*, *A. lesbiacum*, and *A. fallacinum*. Other Ni-hyperaccumulating species which may be employed include: *A. argenteum*, *A. bertolonii*, *A. tenium*, *A. heldreichii*. About 250 other plant taxa have been shown to hyperaccumulate nickel, but many of these do not exceed 10,000 mg Ni/kg d.w., and the majority are of tropical origin.

The identified metal species are accumulated by growing the Alyssum in nickel-rich soil, under specific soil conditions. The conditions include: 1) lowering the soil pH, which increases the phytoavailability of nickel; 2) maintaining low Ca or lowering Ca in the soil by leaching calcium from the soil by appropriate treatments and by use of low Ca, Mg-rich soil amendments; 3) using ammonium containing or ammonium-generating nitrogen fertilizers to improve plant growth and to increase Ni hyperaccumulation due to rhizosphere acidification; and 4) applying chelating agents to the soil to improve nickel uptake by the roots of the hyperaccumulating Alyssum species. Examples of suitable chelating agents include nitrilotriacetic aced (NTA). Other chelating agents commonly used in connection with increasing soil metal mobility for plant uptake include ethylenediaminetetraacetic acid, and ethylene glycol-bis-($\beta$-aminoethylether)-N, N-tetraacetic acid. Maintenance of these four soil-conditioning factors will improve nickel hyperaccumulation in Alyssum, in excess of a 2.5 percent concentration in above-ground portions of the plant, particularly leaves and stems, which make for easy cultivation and metal recovery. This is preferable to concentration in the roots, discussed in Raskin et al, which may be an aid in soil remediation if non-leachable therefrom, but does not offer convenience for phytomining.

DETAILED DESCRIPTION OF THE INVENTION

Applicants have screened a large wild-type collection of germplasm to identify hyperaccumulating plants. In particular, plants of the Brassicaceae family, particularly naturally occurring plants as opposed to those with induced mutations, such as those employed in the Raskin patent, are known to be Ni+Co accumulators. Within the family, and even with the various genera, however, wide variations in metal accumulation, to the extent it occurs, do appear. Alyssum species that are preferred candidates for use in the claimed invention concentrate and hyperaccumulate nickel, show enhanced uptake of cobalt and may be useful in accumulating other metals. It has a preference for, and a high toxicity resistance to these metallic elements. This appears to be due to evolutionary driving forces, which permit the plant to benefit from the ecological niche presented. This should be contrasted with the response of a different Brassicaceae member, Thlaspi caerulescens, which accumulates very high levels of zinc and cadmium. While Alyssum exhibits a higher uptake rate at low nickel and cobalt concentrations than other species, Thlaspi actually grows well on soils with much higher Zn and Cd concentrations. Thus, while Alyssum concentrates nickel and cobalt over a range of concentrations, Thlaspi hyperaccumulates very high levels of Zn and Cd, some strains accumulating Ni and Co. Rather than relying on the unpredictable process of mutagenesis, the applicants in screening a large library of wild-type germplasm, have identified several Alyssum species including A. murale, A. pintodasilvae (A. serpyllifolium ssp.), A. malacitanum, A. lesbiacum, A. tenium and A. fallacinum as a suitable hyperaccumulators of nickel and useful in the enhanced uptake of cobalt. The same plants may also accumulate Pd. Rh, Ru, Pt, Ir, Os and Re. While these platinum and palladium metals are accumulated in lower concentrations, their greater value per unit weight, makes phytomining of these metals economically attractive as well.

SOIL MANAGEMENT:

To improve nickel and cobalt sequestration in the above-ground tissues of Alyssum plants, the soil in which they are grown is preferentially conditioned taking advantage of four different factors.

These include soil pH, low calcium concentrations, use of ammonium containing or generating fertilizer rather than other N-fertilizers and application of chelating agents. Each of these is considered in turn below.

SOIL PH:

The maintenance of preferred pH ranges in soil is well known in agriculture for a variety of reasons. Typically, pH of soil is altered or modified so as to maintain it within a near neutral range of about 6.0–7.5. Thus, soil near a limestone foundation or other building may be treated with acidifying soil amendments so as to reduce an alkaline pH. Soil with a naturally low pH may instead be treated with limestone or similar amendment, so as to increase the soil pH. A reduced pH increases the phytoavailability of nickel and cobalt. A reduced pH increases solubility, and optimizes the release of these metals for absorption by the roots, and translocation to the above-ground tissues of the plant. Soil pH can be maintained in any of a variety of established methods, and the methods themselves do not constitute an aspect of this invention. Preferably, soil pH is managed at a low value by addition of sulfur and use of ammonium—N fertilizers. The Alyssum species, and indeed, any plant species, grows best at its evolved optimum pH conditions. Thus, pH cannot be reduced so low as to substantially retard or inhibit plant growth. An optimum pH range for phytomining using Alyssum is a pH of 4.5 to 6.2, preferably 5.2–6.2. After extraction of economically phytominable Ni and Co from the soil, limestone application can raise soil to pH levels required by more traditional farm crops.

LOW CALCIUM CONCENTRATIONS:

Alyssum species which hyperaccumulate Ni and Co evolved in Ni-rich ultramafic and serpentine soils which simultaneously have low soil calcium. The presence of high calcium concentrations in soil may inhibit nickel/cobalt hyperaccumulation by Alyssum. Acceptable calcium concentrations in soil ranges from an absent value to a value such that exchangeable soil calcium is less than 20% of exchangeable soil Mg. While values of calcium in the soil higher than this will not inhibit Alyssum growth, it will reduce nickel/cobalt hyperaccumulation, and thus frustrate a principal goal of this invention. Calcium concentrations may be reduced by any of a variety of known methods. A preferred method involves acidification of the soil with sulfur, sulfuric acid, or other amendments and leaching, followed by use of low Ca soil amendments. Whatever method is selected to reduce calcium concentration in soil, it should be selected so as to be consistent with the objective of soil phytomining.

ADDITION OF AMMONIUM FERTILIZER:

Generally, high metal concentrations are toxic to plants, and inhibitory of plant growth. While Alyssum has developed the ability to hyperaccumulate nickel/cobalt in its above-ground plant tissues, nonetheless, fertilizer support for the growth, particularly in polluted soil, is an essential element for substantial hyperaccumulation. Use of high-ammonium N-fertilizers is of value. Nonetheless, the use of ammonium fertilizers per se is well known, and acceptable fertilizers and protocols will be arrived at by those of ordinary skill in the art on an empirical basis.

ADDITION OF CHELATING AGENTS:

Metal chelates are commonly used in agriculture, and occur naturally is living cells. The addition of chelating agents, such a NTA, or any of a variety of amino-acetic acids known to those of ordinary skill in the art as chelating agents, to the soil to be phytomined for Ni/Co and Pt,Pd metals improves the movement of soil metals to root surfaces for uptake and translocation of these materials into the above-ground plant tissues. Any of a variety of known chelating agents of commerce may be used. A preferred chelating agent is NTA or EDTA. Typically, chelating agents will be added at 5–100 kg/ha after the plants are established. As with the use of fertilizers, optimum additions of chelating agents can be determined on an empirical basis. Chelating compounds which chelate Ni in the presence of high soil levels of Fe, Mg, and Ca selectively increase Ni uptake by the hyperaccumulator plants.

METAL RECOVERY:

As noted, a principal object of this invention is the recovery of the metal sequestered by the hyperaccumulating plant. In U.S. Pat. No. 5,364,451, plants are identified which accumulate the metals in the roots. Recovery of metals from roots poses substantial mechanical problems, including the recovery of the root itself, as well as recovery of the metal from the root tissue. By cultivating selected Alyssum genotypes, as contemplated in the claimed invention, a very high degree of the nickel/cobalt absorbed by the roots is translocated to above-ground tissues, such as stems, leaves, flowers and other leaf and stem tissues. This feature facilitates recovery of the metal extracted from the soil. The Alyssum can be harvested in conventional fashion, that is, cutting of the plant at soil level. The harvested materials are left to dry, in much the same fashion that alfalfa is dried, so as to remove most of the water present in the plant tissues. After drying, the plant material is collected from the field by normal agricultural practices of hay-making, incinerated and reduced to an ash with or without energy recovery. This organic material may alternatively be further treated by roasting, sintering, or smelting methods which allow the metals in an ash or ore to be recovered according to conventional metal refining methods such as acid dissolution and electrowinning. With metal concentrations as high as 2.5 to 5.0% in the above-ground plant tissues, metal recovery becomes economical, thus satisfying the primary objective of the invention. Conventional smelting/roasting/sintering temperatures of 500–1500° F. are sufficient to combust the organic material in the dried plant biomass, leaving a residue of the accumulated metal, with few contaminants which are known to interfere with metal refining. Indeed, it is suspected that the other components of the ash will be lower than with conventional mined ore concentrates.

What is claimed is:

1. A method of recovering nickel from soil, comprising:
   cultivating Alyssum plants in soil containing nickel, under conditions sufficient to permit said Alyssum to accumulate nickel from the soil in above-ground tissues of said Alyssum;
   harvesting said Alyssum as biomass materials after accumulation of nickel from the soil, and;
   recovering the nickel from said harvested biomass materials, wherein said soil is conditioned by maintaining the pH of the soil at within a range of 4.5 to 6.2.

2. The method of claim 1, wherein said soil, has an exchangeable calcium concentration and an exchangeable Mg concentration, and wherein the exchangeable calcium concentration is managed such that it has a value lower than 20% of the exchangeable Mg concentration, adding ammonium-containing fertilizer to said soil and adding chelating agents to said soil.

3. The method of claim 1, wherein said metal is recovered by drying and combusting, said harvested biomass materials, to oxidize and vaporize organic materials present.

4. A method of recovering nickel from soil, comprising:
   cultivating Alyssum plants in soil containing nickel, under conditions sufficient to permit said Alyssum to accumulate nickel from the soil in above-ground tissues of said Alyssum such that at least 2.5% of the air-dried above-ground tissue of said Alyssum is nickel;
   harvesting said Alyssum as biomass materials after accumulation of nickel from the soil, and;
   recovering the nickel from said harvested biomass materials.

5. The method of claim 4, wherein said soil is conditioned by maintaining the pH of the soil at within a range of 4.5 to 6.2.

6. The method of claim 5, wherein said soil has an exchangeable calcium concentration and an exchangeable Mg concentration, and wherein the exchangeable calcium concentration is managed such that it has a value lower than 20% of the exchangeable Mg concentration.

7. The method of claim 6, wherein ammonium-containing fertilizer is added to said soil.

8. The method of claim 7, wherein chelating agents are added to said soil.

9. A method of recovering nickel from soil, comprising:
   cultivating Alyssum plants in soil containing nickel, under conditions sufficient to permit said Alyssum to accumulate nickel from the soil in above-ground tissues of said Alyssum, wherein said soil has an exchangeable calcium concentration and an exchangeable Mg concentration and wherein the exchangeable calcium concentration is managed such that it has a value lower than 20% of the exchangeable Mg concentration;
   harvesting said Alyssum as biomass materials after accumulation of nickel from the soil, and;
   recovering the nickel from said harvested biomass materials.

10. The method of claim 1, wherein said Alyssum plants are selected from the group consisting of *A. murale, A. pintodasilvae, A. malacitanum, A. lesbiacum, A. fallacinum, A. argentum, A. bertolonii, A. tenium, A. heldriechii*, and mixtures thereof.

11. The method of claim 4, wherein said Alyssum plants are selected from the group consisting of *A. murale, A. pintodasilvae, A. malacitanum, A. lesbiacum, A. fallacinum, A. argentum, A. bertolonii, A. tenium, A. heldriechii*, and mixtures thereof.

12. The method of claim 9, wherein said Alyssum plants are selected from the group consisting of *A. morale, A. pintodasilvae, A. malacitanum, A. lesbiacum, A. fallacinum, A. argentum, A. bertolonii, A. tenium, A. heldriechii*, and mixtures thereof.

* * * * *